(No Model.)
F. R. CHAMBERLAIN.
PNEUMATIC TIRE.
No. 586,352. Patented July 13, 1897.
Fig. 1 Fig. 2
Fig. 3
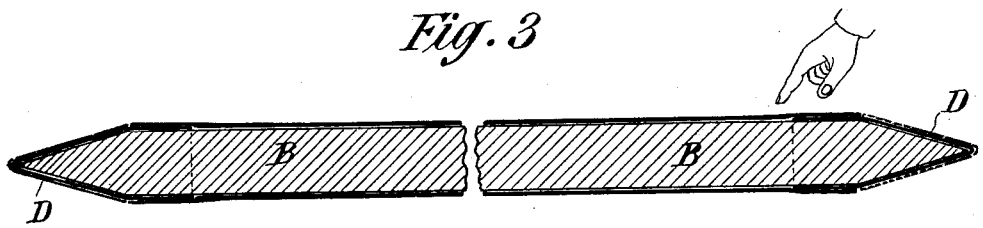
Fig. 4
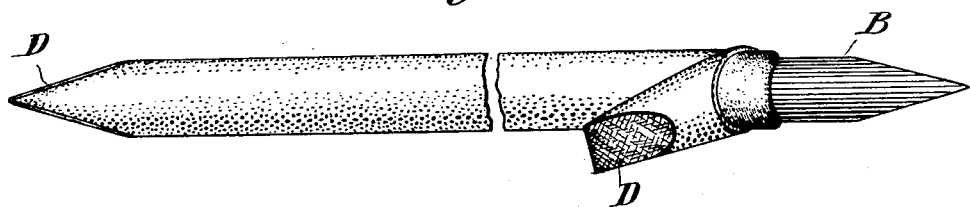
Fig. 5
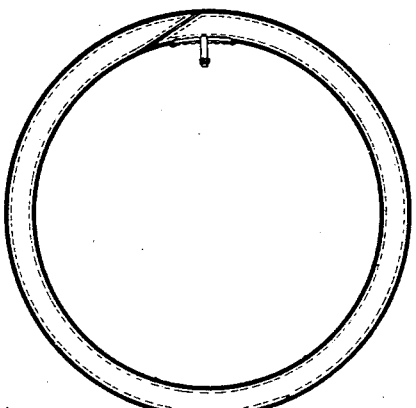
Witnesses: Inventor:
Raphael Netter Frank R. Chamberlain
Dury A. Cooper by Ken. Curtis Page, Attys

UNITED STATES PATENT OFFICE.

FRANK R. CHAMBERLAIN, OF NEWTON, MASSACHUSETTS, ASSIGNOR TO THE NEWTON RUBBER WORKS, OF WEST VIRGINIA.

PNEUMATIC TIRE.

SPECIFICATION forming part of Letters Patent No. 586,352, dated July 13, 1897.

Application filed March 1, 1897. Serial No. 625,509. (No model.)

*To all whom it may concern:*

Be it known that I, FRANK R. CHAMBERLAIN, a citizen of the United States, residing at Newton Upper Falls, in the county of Middlesex and State of Massachusetts, have invented certain new and useful Improvements in Pneumatic Tires, of which the following is a specification, reference being had to the drawings accompanying and forming a part of the same.

The invention subject of my present application is an improvement in the inner inflatable or air tubes for pneumatic tires and in methods of manufacturing the same. Heretofore these tubes when designed for use with pneumatic tires have been made with closed ends which overlap when the tube is inserted in the casing or sheath of the tire. In some instances the ends of the tubes have been formed with faces squared, so that they simply abutted when the tube was in its sheath. In others the ends have been beveled or inclined, so as to form a scarf-joint when overlapped. In still another form the ends of the tube have been flattened and closed, so as to leave solid extensions or end portions which when the tube is in its sheath overlap, so that the solid portion of one end overlaps an inflated portion of the other.

Theoretically the scarf-joint made by a tube with overlapping beveled ends is the most desirable, as it contains no solid part which produces any noticeable unevenness on the tread portion of the tire when the latter is fully inflated, but such tubes have not, so far as I am aware, come into any extended use, mainly for the reasons that they were difficult and expensive to manufacture and liable to rupture at the end or edge of the beveled portion.

The object of my invention is to produce an inner or air tube with beveled or wedge-shaped ends which shall not be open to the objections found to exist in such forms of tube as heretofore made, and to this end I make a tube of thin rubber with beveled or wedge-shaped ends reinforced interiorly at the points or extreme ends by strips of fabric.

I have also devised a novel, simple, and economical process of manufacturing such tubes, which I shall now describe by reference to the accompanying drawings.

Figure 1 is a view of a mandrel which I employ for making the end portions of the tube. Fig. 2 is a perspective view of such end. Fig. 3 is a sectional view showing the tube-mandrel enveloped by the tube. Fig. 4 is a view illustrating the method of removing the tube from the mandrel. Fig. 5 is a sectional view of a tire-sheath containing the tube.

I use in the process of making the tubes two forms of mandrel as a matter of convenience. One form, A, as shown in Fig. 1, is of a circumference proportioned to the size of tube desired and has a beveled or tapered end, but is comparatively short. Another form, B, (shown in Fig. 3,) is of the same circumference as the first, but is of the length required for the finished tube and has both ends tapered or beveled. It will be understood, of course, that the use of two mandrels is purely arbitrary, but I am describing the most convenient and practicable plan of which I am aware for carrying out the invention.

I first wrap the short mandrels A with a thin covering of crude rubber and over the tapered ends of the same I fold strips of fabric D, which adhere to the crude rubber. The crude rubber on the short mandrels is then partially vulcanized and stripped off in the form of caps C, Fig. 2. These caps are then drawn over and fitted to the ends of the long mandrel B, and a sheet or strip of crude rubber is wrapped around or in any of the usual ways applied to the central part of the mandrel and over so much of the end portions already covered as will form a good lapped joint with the semivulcanized caps thereon. The overlapped portions are then pressed or rolled to make a smooth and perfect joint. The mandrel is then placed in the vulcanizing-oven and cured. As is customary in such cases, I wrap the mandrel with the unvulcanized tube thereon with a suitable fabric before putting it in the oven, which operation may be readily accomplished by revolving the whole in a lathe and winding a strip of sheeting or other suitable material around it. After vulcanization a small hole is cut in the tube at the point indicated by the index-finger and the end of the tube pulled along the mandrel until the hole is brought to the adjacent end of the same, which is then passed out through the hole and the tube then merely stripped from the mandrel and at the same time turned inside out. The portion of the tube which is thus withdrawn from the mandrel without inversion is turned inside out by drawing its end through the hole. The reinforcing-strips D will now be inside of the tube, and the latter is completed by the application of the valve-tube to the hole through which the mandrel was withdrawn.

The additional vulcanization to which the ends of the tube are subjected renders them slightly firmer and stronger, but the joints between the ends and main section of the tube are scarcely perceptible, and for all practical purposes there is formed a tube with closed wedge-shaped and reinforced ends, the rubber walls of which are of uniform thickness and homogeneous in character. This tube is used with any outer sheath, into which it may be introduced by simply drawing or placing it within such sheath and permitting its ends to overlap. The extent of overlap is largely immaterial. It may be reinforced wherever necessary on its exterior surface by strips of fabric applied thereto in the usual manner.

What I claim as my invention is—

1. An inflatable inner tube for pneumatic tires, composed of vulcanized india-rubber having closed beveled or wedge-shaped ends reinforced by a strip of adherent fabric applied to the interior surface of the beveled or wedge-shaped ends only, as set forth.

2. The improvement in the art of manufacturing inner air-tubes for pneumatic tires, which consists in forming a tube of india-rubber with closed beveled or wedge-shaped ends, reinforcing the ends only by applying and causing to adhere to the same strips of fabric, forming a slit or opening in the tube, and inverting the tube by drawing its ends through such opening, as set forth.

3. The improvement in the art of manufacturing inner air-tubes for pneumatic tires which consists in independently forming and partially vulcanizing short sections of tube with closed beveled or wedge-shaped ends, reinforcing the said ends exteriorly with fabric, uniting the sections to the open ends of an unvulcanized tube, vulcanizing the whole, then forming a slit or opening for the valve in the tube and inverting the tube by drawing its ends through said opening, as set forth.

4. The process herein described, which consists in forming caps of crude rubber on short mandrel-sections having beveled or wedge-shaped ends, and partially vulcanizing the rubber, then stripping the rubber from the short mandrels and drawing the caps onto the ends of a long mandrel, then wrapping or applying crude rubber to the long mandrel and overlapping the partially-cured caps, then subjecting the whole to vulcanization and withdrawing the mandrel through a hole or slit in the tube, as set forth.

FRANK R. CHAMBERLAIN.

Witnesses:
W. H. GLEASON,
WM. J. KELLY.